United States Patent [19]
Morgan

[11] Patent Number: 4,792,965
[45] Date of Patent: Dec. 20, 1988

[54] OSCILLATOR SYSTEM FOR DETECTING A SELECTED ONE OF A PLURALITY OF TUNED CIRCUITS

[76] Inventor: Harvey L. Morgan, 5580 Sarasota, Arlington, Tex. 76017

[21] Appl. No.: 8,486

[22] Filed: Jan. 29, 1987

[51] Int. Cl.[4] ...................... H04B 5/00; H04B 13/02; G08C 19/12
[52] U.S. Cl. ......................................... 375/6; 455/41; 340/870.31; 379/55; 178/43
[58] Field of Search ................. 375/6; 455/19, 41, 40; 246/7, 8; 381/79; 178/43; 379/55; 200/DIG. 1; 340/825.54, 870.31, 870.32, 505, 531

[56] References Cited

U.S. PATENT DOCUMENTS

| | | | |
|---|---|---|---|
| 3,299,424 | 1/1967 | Vinding | 340/870.31 |
| 3,427,614 | 2/1969 | Vinding | 340/870.31 |
| 4,209,783 | 6/1980 | Ohyama et al. | 340/825.54 |
| 4,312,001 | 1/1982 | Marzolf | 340/870.32 |

Primary Examiner—Robert L. Griffin
Assistant Examiner—Andrew J. Telesz, Jr.
Attorney, Agent, or Firm—Dennis T. Griggs

[57] ABSTRACT

The system of the present invention allows transmission of information and data across a gap, for example, from the steering wheel of an automobile to the steering column, without any physical connection between the information source and the information or data gathering circuit. Furthermore, the information source requires no power. The system of the present invention utilizes the principle that an oscillator circuit is loaded by an inductively coupled circuit tuned to oscillate at approximately the same frequency. Loading the oscillator circuit causes the oscillator L-C loop voltage amplitude to decrease. Using a first oscillator selectively switched between multiple frequencies, a circuit inductively coupled to that oscillator and selectively switched between multiple frequencies tuned to the frequencies of the oscillator, and a logic circuit for determining at which of the several frequencies the oscillator is running produces a decrease in oscillator L-C loop voltage, the system of the present invention provides for information and data to be transmitted across a gap without any physical connection between the information or data source and the information or data gathering circuit.

9 Claims, 3 Drawing Sheets

OSCILLATOR SYSTEM FOR DETECTING A SELECTED ONE OF A PLURALITY OF TUNED CIRCUITS

BACKGROUND OF THE INVENTION

The problem of attempting to transmit information across a gap, particularly where one or two members forming the gap is moveable, for example, the gap formed between the steering wheel and steering column of an automobile has long plagued the art. Principally, information and data regarding switch closures, for example, horn switch closures and electronic speed control switch closures, needs to be transmitted from the moveable steering wheel to the affixed steering wheel column across the gap formed therebetween. Prior art attempts have included mechanical connection means such as a conductive ring affixed to the steering column with brushes or other wiping contacts making contact with that conductive ring. As is apparent, such physical friction generating contacts eventually lead to wearing down of the contact surfaces and deterioration of the electrical communication therebetween. Also in the case of accessories not manufactured by the original manufacturer, for example, electronic speed controls, there is the problem of mounting a universal type switch mechanism that can be used on different makes and models of automobiles or other equipment without extensive reconstruction or modification of the automobile.

SUMMARY OF THE INVENTION

The present invention obviates the aforementioned diadvantages by permitting data and information, principally information regarding switch closures, to be tramsmitted across a gap, for example, the gap created by an automobile steering wheel and steering column, which requires no physical connection between the information source, e.g., switches mounted on the steering wheel, and the information gathering circuit, e.g., circuitry detecting switch closure mounted on the steering column. An additional advantage of the present invention is that the information source requires no power.

Therefore, one or more switches may be mounted on an automobile steering wheel and information regarding whether a switch is closed and, if so, which of several switches has been closed may be transmitted across a gap to a fixed receiving circuit. The switch circuit or circuits mounted on the steering wheel require no power for their operation.

Information transmission from a moveable member, for example, an automobile steering wheel, to a fixed member, for example, an automobile steering column, is accomplished by displacing an inductor or coil in an L-C circuit at one side of the transmission system (moveable member) and tuned by switch closure to approximately the same frequency as an inductor feedback oscillator driving an inductor or coil on the other side (fixed member) of the transmission system. The inductor or coil of the tuned L-C circuit on the moveable member is inductively coupled to the inductor or coil of the inductive feedback oscillaltor circuit on the fixed member. The oscillator voltage amplitude of the inductive feedback oscillator will drop, when loaded by the similarly tuned L-C circuit in close proximity and inductively coupled thereto due to the loading of the oscillator circuit by the L-C tuned circuit on the moveable member.

Multiple switches may be mounted on the moveable member or information source side of system to create a plurality of differently tuned L-C circuits. In one embodiment of the present invention, two switches on the moveable or information source end of the transmission system are each connected in series with a capacitor and an inductor or coil. Resonant frequencies of the coil-capacitor-switch combinations are varied bewteen the two switched circuits by selecting different capacitive values for the capacitors in each L-C circuit. Therefore, two differently tuned L-C circuits, selectable by two switches, are disposed on the moveable or information source end of the transmission system. On the other fixed or information gathering end of the transmission system, a first oscillator is switched between the same two frequencies of the L-C circuits mounted on the moveable member or the information source side of the system by a second oscillator which switches a capacitor into and out of parallel connection with a principal capacitor in the first oscillator's tuned circuit. Therefore, the first oscillator on the fixed member (the information gathering side of the system) periodically oscillates at one of the two frequencies of the L-C circuits on the fixed member (the information source side of the system). When a switch on the moveable or information source end of the transmission link is closed to create a first L-C circuit tuned to frequency $f_1$, corresponding to one of the first oscillator's frequencies, the voltage amplitude of that first oscillator will be reduced because of the energy absorbed by the first L-C circuit when that first oscillator is operating at frequency $f_1$. Similarly, when a switch on the moveable or information source end of the transmission link is closed to create a second L-C circuit tuned to frequency $f_2$ corresponding to the other of the first oscillator's frequencies, the voltage amplitude of that first oscillator will be reduced because of the energy absorbed by the first L-C circuit when the first oscillator is operating at frequency $f_2$. The voltage amplitude of the first oscillator will not be reduced when it is operating at the $f_2$ frequency and the first L-C circuit is tuned to $f_1$ and vice-versa. The combination of the first oscillator's output amplitude (decreased or normal) and the switching state of the second switching oscillator, therefore, identifies the first oscillator frequency and correspondingly which switch on the moveable end of the transmission link has been closed. The system of the present invention, as more fully described below, uses a logic arrangement to make that identification.

The information transmission system of the present invention is not, however, limited to transmission of information as to which of plurality of switches were closed. Serial data can be transmitted by holding the first oscillator to a single frequency and switching the moveable end coil between that first oscillator resonance frequency and some other value. An analog signal could thus be transmitted by using pulse width modulation of the moveable end resonance condition. Digital signals could also be similarly transmitted using the logic arrangement of the present invention. Data respecting which one of a large number of moveable end switches had been closed could be transmitted by correspondingly increasing the number of first oscillator frequencies.

Therefore, the principal object of the present invention is a system for permitting transmission of information across a gap from a passive unpowered unit which may be moveable to an active powered unit which may be fixed.

A further object of the present invention is to permit transmission of information across a gap from an unpowered unit to a powered active unit.

A further object of the present invention is to provide a system allowing control of an automobile cruise control unit having control switches mounted on an automobile steering wheel coupled to an active unit on the automobile steering column without any mechanical connection between the unit mounted on the steering wheel and the unit mounted on the steering column.

Therefore, although the primary object of the invention is to provide a passive data coupling system, other objects, features, and advantages of the invention will become evident in light of the following detailed description, in conjunction with the referenced drawings, of a preferred exemplary system according to the invention.

DETAILED DESCRIPTION OF THE INVENTION

For purposes of illustration only, the data transmission system 10 of the present invention will be described by reference to passive circuit 11 and active circuit 12. Passive circuit 11 consists of a pluralilty of tuned L-C circuits; each circuit selectable by closing switches $S_1$ or $S_2$ (13 and 14 respectively). Passive circuit 11 may be mounted on a moveable member, for example, an automobile steering wheel or any information source where actual physical connection between the information source and an information gathering source is difficult or undesirable. Active circuit 12, on the other hand, may be mounted on a fixed member, for example, an automobile steering column, such that data respecting switch closure in passive circuit 11 may be transmitted across a gap, for example, between the steering wheel and steering column, to active circuit 12 without any physical connection therebetween. As aforesaid, the transmission system of the present invention, of course, is applicable to any environment where a physical connection between the two circuits is undesirable or difficult.

Figure 1:
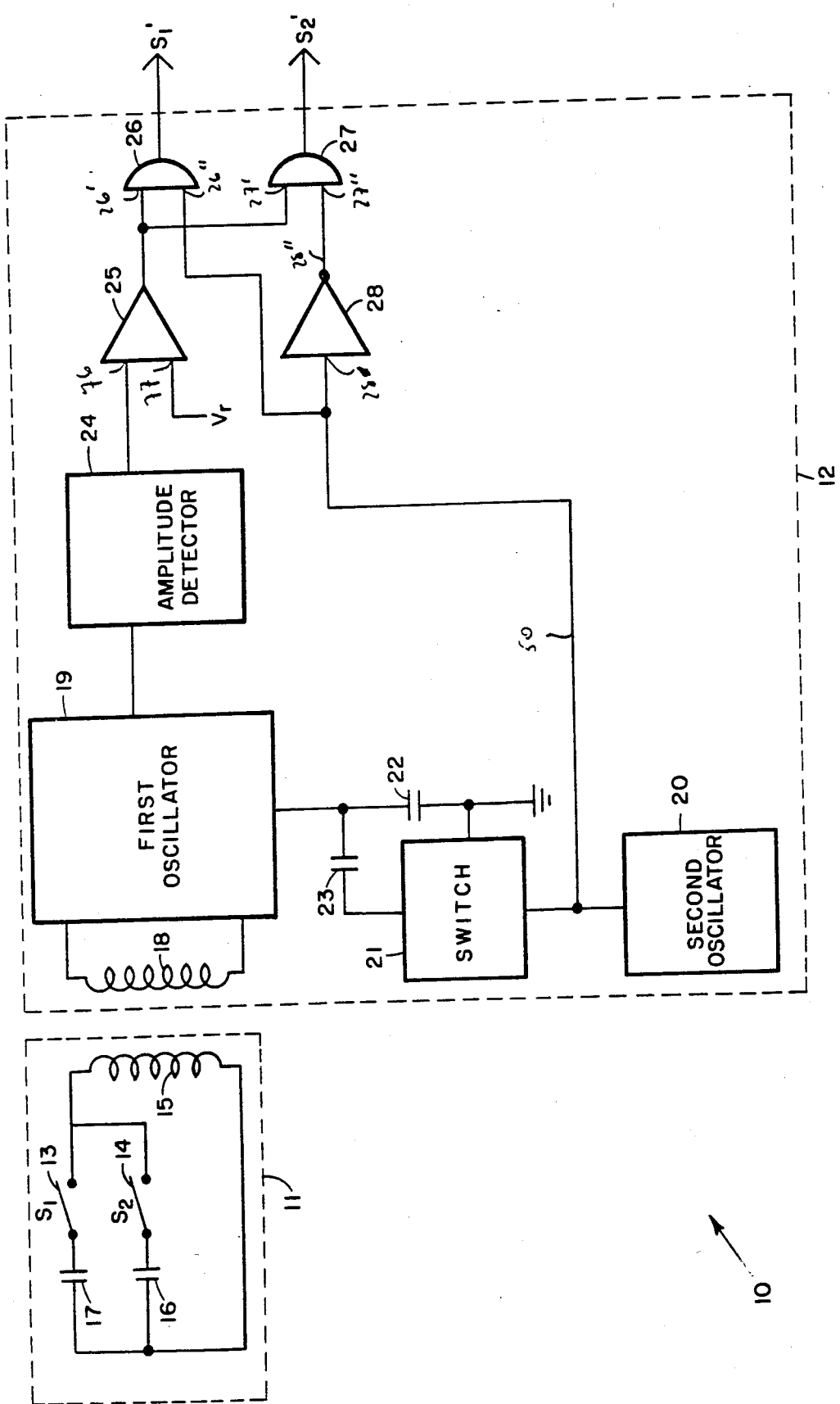
FIG. 1 a block circuit diagram of the present invention.

As shown in FIG. 1, passive circuit 11 consists of one or more switches 13, 14 for completing serial connection between inductor or coil 15 and either capacitor 16 or capacitor 17, respectively. Closure of switch 13 thus forms a tuned L-C circuit consisting of inductor or coil 15 and capacitor 17 which forms a circuit tuned to frequency $f_1$ depending on the inductance and capacitance values of inductor 15 and capacitor 17. Similarly, closure of switch 14 creates a tuned L-C circuit consisting of inductor or coil 15 and capacitor 16 which forms a circuit tuned to frequency $f_2$.

Inductor 15 in passive circuit 11 is disposed adjacent to and in such proximity as to inductively couple inductor or coil 18 of active circuit 12. Inductor 18, as more fully described below, serves as the inductor in inductive feedback oscillator 19.

A second oscillator 20 in active circuit 12 outputs a pulsed signal which drives electronic switch 21, which also may be an electro-mechanical switch, between open and closed positions thereby switching capacitor 23 into and out of an electrically parallel connection with capacitor 22. Therefore, second oscillator 20 driving switch 21 between open and closed positions tunes first inductive feedback oscillator 19 to frequency $f_2$ when switch 21 is open, thereby forming a circuit of inductor 18 and capacitor 22, and to frequency $f_1$ when switch 21 is closed thereby forming a circuit of inductor 18 and capcitors 22 and 23 in parallel.

The pulsed output of second oscillator 20 is also applied to one input 26″ of AND-gate 26 and to the input 28′ of inverter 28. The output 28″ of inverter 28 is connected to one input 27″ of AND-gate 27.

A voltage amplitude peak-reading detector 24 is operably connected to first inductive feedback oscillator 19. The oscillation amplitude of first oscillator 19 is thus detected by amplitude detector 24 which outputs a signal to voltage comparator 25 which is proportional to the oscillation amplitude of oscillator 19. Voltage comparator 25 compares the output signal of amplitude detector 24 against a reference voltage $V_r$ and outputs a signal to a first input 26′ of AND-gate 26 and a first input 27′ of AND-gate 27 if the signal from amplitude detector 24 drops below $V_r$. The reference voltage ($V_r$) on comparator 25 is set below the normal oscillation amplitude of first oscillator 19. Therefore, comparator 25 will only generate a signal to the inputs of AND-gates 26 and 27 if the amplitude of first oscillator 19 drops below its normal value.

AND-gate 26 and AND-gate 27 coupled with inverter 28 form a logic circuit for determining which of switches 13 or 14 or either are closed as will become apparent hereinafter.

The circuit operates as follows: Second oscillator 20 continually causes switch 21 to open and close which, in turn, causes capacitor 23 to be continually switched out of and into, respectively, parllel electrical connection with capacitor 22. With switch 21 closed and capacitors 23 and 22 in parallel, first oscillator 19 oscillates at a frequency $f_1$. With switch 21 open, oscillator 19 oscillates at a frequency $f_2$.

The pulses from second oscillator 20 which drive switch 21 between open and closed positions are also applied to a second input 26″ of AND-gate 26 and the input 28′ of inverter 28 having an output 28″ connected to a second input 27″ of AND-gate 27. Thus, a pulse from second oscillator 20 closing switch 21 and causing oscillator 19 to oscillate at frequency $f_1$ will also cause a high true signal of "1" at the second input to AND-gate 26 and a high true signal of "1" at the input 28′ of inverter 28. The output 28″ of inverter 28 will be a low of "0" signal applied to the second input 27″ of AND-gate 27. Similarly, between pulse from second oscillator 20, switch 21 will open and cause oscillator 19 to oscillate at frequency $f_2$. Accordingly, the signal at the second input 26″ to AND-gate 26 and the input 28′ to inverter 28 will be a low or "0" signal. The output of inverter 28 will, therefore, cause a high true or "1" signal to occur at the second input 27″ to AND-gate 27.

If switch 13 ($S_1$) were closed, passive circuit 11 would be tuned to frequency $f_1$. The voltage amplitude of first oscillator 19 would, thus, decrease when it oscillated at frequency $f_1$ but would remain normal when it oscillated at frequency $f_2$. The voltage amplitude decrease at frequency $f_1$ would cause comparator 25 to output a high true or "1" signal to the first inputs 26' and 27' of AND-gates 26 and 27. The output of second oscillator 20 causes a high true or "1" signal to occur at the second input 26" to AND-gate 26, but through inverter 28 a low or "0" signal at the second input 27" to AND-gate 27. Thus, AND-gate 26 will output a high true or "1" signal $S_1'$ indicating switch $S_1$ (13) was closed. AND-gate 27 would output a low or "0" signal indicating switch $S_2$ (14) was open.

Figure 2:
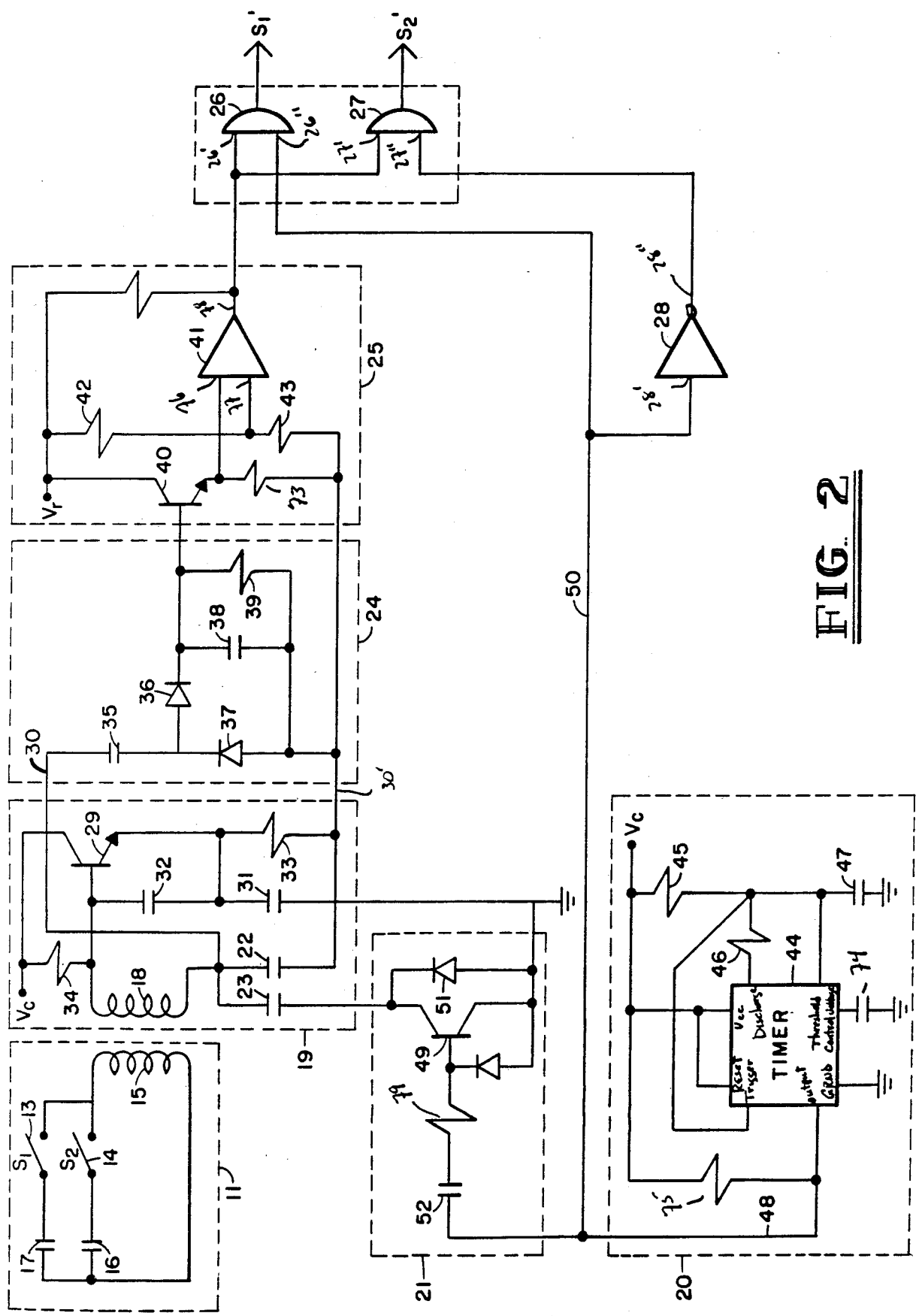
FIG. 2 is a detailed circuit schematic of the present invention.

A more detailed description is given with reference to FIG. 2. First oscillator 19 consists of a transistor 29, capacitors 31 and 32, and resistors 33 and 34 connected in an inductive feedback fashion with inductor 18 and capacitors 22 and 23 primarily determining the frequency of oscillation. Hereinafter described switch 21 periodically shunts capacitor 23 across capacitor 22 to ground. First oscillator 19 will, therefore, oscillate at a first frequency $f_1$ determined by the values of inductor 18, capacitor 22 and capacitor 23. First oscillator 19 will oscillate at a second frequency $f_2$ determined by the values of inductor 18 and capacitor 22. First oscillator 19 is operatively connected by lines 30 and 30' to peak reading amplitude detector 24.

Peak reading amplitude detector 24 consists of capacitor 35, diode 36, diode 37, capacitor 38 and resistor 39 connected and operating in known fashion.

Peak reading amplitude detector 24 furnishes the peak value of the voltage amplitude oscillations of first oscillator 19 to the base of transistor 40 in comparator circuit 25. The emitter of transistor 40 is connected to one input 76 of a voltage comparator 41. Resistors 42 and 43 function as a voltage divider furnishing a reference voltage to the other input 77 of voltage comparator 41. That reference voltage is set to approximately equal the normal amplitude output of first oscillator 19. Resistor 73 serves to determine the magnitude of the siganl applied to comparator 41. The output 78 of comparator 41 is connected to one input 26' of AND-gate 26. The other input 26" of AND-gate 26 is connected to the input 28' of inverter 28 and the output of second oscillator 20 by line 50. The first input 26' of AND-gate 26 is also connected to the first input 27' of AND-gate 27. The second input 27" of AND-gate 27 is connected to the output 28" of inverter 28.

Second oscillator 20 may take any form of an oscillator providing pulsed output and, for example, may consist of a timer 44, for example, a 555 monolithic timer, connected in self-triggering free running fashion as illustrated.

The 555 timer runs freely with a nearly symetrical square wave which is applied to the base of transistor 49 in switch 21. When transistor 49 is nonconducting, diode 51 is also nonconducting. When transistor 49 is conducting, diode 51 and transistor 49 conduct alternately, thus shunting capacitor 23 to ground across capacitor 22. A coupling capacitor 52 and limiting resistor 79 are preferably connected between the base of transistor 49 and second oscillator 20 to block any DC and allow transistor 49 to alternate between 'ON' and 'OFF'. When the 555 timer output is high, transistor 49 is, thus, saturated allowing capacitor 23 to become active.

Capacitor 47 charges through resistor 45 and discharges through resistor 46. Therefore, the duty cycle of oscillator 20 may be set by the ratio of those two resistors. The frequency of second oscilltor 20 should be set less than the frequency of first oscilltor 19 by a factor of 10 or more. The frequencies $f_1$ and $f_2$ of first oscillator 19 should normally be separated by five percent (5%) or more to keep loading on the first oscillator small due to coil 15 tuning by switch closure to a frequency at which the first oscillator is not operating.

Capacitor 74 is typically a 0.01 microfarad capacitor connected to ground. Resistor 75 is a load resistor the value of which determines the magnitude of the output pulse.

Output from second oscillator 20 is taken on line 48 to the input of switch 21 and also on line 50 to the second input 26" of AND-gate 26.

The output of second oscillator 20 taken on line 48, as described above, periodically turns on transistor 49, thereby shunting capacitor 23 across capacitor 22 to ground. Therefore, when switch 21 is open between pulses from second oscillator 20, the frequency $f_2$ of first oscillator 19 will be determined by inductor 18 and capacitor 22. When switch 21 is closed by pulses from second oscillator 20, the frequency $f_1$ of first oscillator 19 will be determind by inductor 18, capacitor 22 and capacitor 23.

With both switches 13 and 14 in passive circuit 11 open, first oscillator 19 will generate a normal output and, therefore, the signal appearing at the first inputs 26' and 27' of AND-gates 26 and 27 will be a low or "0". Accordingly, the outputs of AND-gates 26 and 27 will be "0" regardless of switching state of switch 21 or the frequency, $f_1$ or $f_2$, at which first oscillator 19 is running. If switch 13 is closed, the L-C circuit consisting of inductor 15 and capacitor 17 through the inductive coupling between inductors 15 and 18 will cause a reduced amplitude output of first oscillator 19 if the frequency of the L-C circuit is tuned to the frequency of oscillator 19. Accordingly, comparator 41 will generate a high true or "1" signal to the first inputs 26' and 27' of AND-gates 26 and 27 when oscillator 19 is operating at a frequency to which the L-C circuit in passive circuit 11 is tuned. If switch 21 was closed, the signal from second oscillator 20 causing switch 21 to close would appear as high true or "1" signal at the second input 26" of AND-gate 26. The signal from second oscillator 20 would be inverted by inverter 28 and would appear as a low or "0" at the second input 27" of AND-gate 27. If switch 21 was open, a low or "0" signal would be output from second oscillator 20 and, accordingly, the second input 26" to AND-gate 26 would be "0" and the second input 27" to AND-gate 27 would be "1". However, because switch 21 is open, first oscillator 19 would now be oscillating at frequency $f_2$ and there would be no amplitude decrease. That is because the L-C circuit with switch 13 closed is tuned to frequency $f_1$. Therefore, comparator 41 would furnish a low or "0" signal to input 26' of AND-gate 26. Because both inputs to AND-gates 26 are "0", AND-gate 26 output would be at logic state "0". Similarly, the input to AND-gate 27 would be a low or "0" at input 27' and a high or "1" at input 27". Therefore, the output of AND-gate 27 would also be at logic state "0".

If $S_2$ (14) were closed and switch 21 was open, first oscilltor 19 would be operating at frequency $f_2$, the same as the frequency of passive circuit 11, that is, the frequency of the tuned circuit having inductor 15 and capacitor 16. Therefore, first oscillator 19 would have a reduced output and comparator 41 would generate a high or "1" to inputs 26' and 27' of AND-gates 26 and 27. The second input 26" to AND-gate 26, however, would be at a low or "0" level. The second input 27" to AND-gate 27 would be a high or "1" by virtue of inverter 28. Therefore, the output of AND-gate 27 would be a high or "1" ($S_2'$), indicating that switch 14 had been closed. Similarly, if switch 21 was closed, first oscillator 19 would be operating at frequency $f_1$ and comparator 41 would generate "0's" at the first inputs 26' and 27' to AND-gates 26 and 27. The second input 26" AND-gate 26 would be a "1" and the second input 27" to AND 27 would be a "0". Therefore, the output of both gates would be at logic state "0".

Thus, when switch $S_1$ or 13 is closed, AND-gate 26 will output a train of high level or "1" signals representing that switch $S_1$ has been closed. When switch $S_2$ or 14 is closed, AND-gate 27 will output a train of high level or "1" signals representing that switch $S_2$ has been closed. Those output signals can be used to control other devices, for example, generate binary bits in a data transmission system, or an automotive electronic speed control system.

Figure 3:
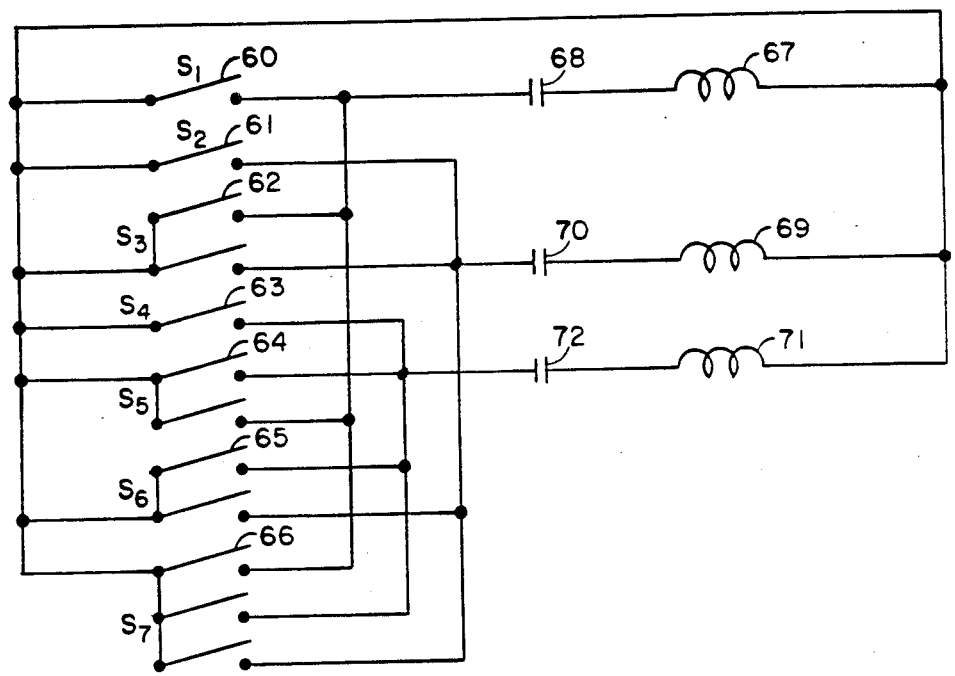
FIG. 3 is a schematic of the present invention illustrating a plurality of switches on the moveable member of the transmission system.

Referring to FIG. 3, therein is illustrated the use of ganged switches and multiple coils to provide information on the state of a large number of switches at one time. For example, as shown in FIG. 3, a set of three frequencies set by switch closure could transmit information as to which of seven switches was closed. Closure of switch 60 would create a passive L-c tuned circuit consisting of inductor 67 and capacitor 68 operating at frequency $f_1$. Closure of switch 61 would create a passive tuned L-C circuit consisting of inductor 69 and capacitor 70 operating at frequency $f_2$. Closure of switch 62 would create two tuned passive L-C circuits; the first consisting of inductor 67 and capacitor 68 operating at frequency $f_1$, and the second consisting of inductor 69 and capacitor 70 operating at frequency $f_2$. Closure of switch 63 would create a passive L-C tuned circuit consisting of inductor 71 and capacitor 72 operating at frequency $f_3$. Closure of switch 64 would create two tuned circuits; the first consisting of inductor 71 and capacitor 72 operating at $f_3$ and the second consisting of inductor 67 and capacitor 68 operating on frequency $f_1$. Closure of switch 65 would create two tuned L-C circuits operating on frequencis $f_2$ and $f_3$; the first consisting of inductor 69 and capacitor 70 and the second consisting of inductor 71 and capacitor 72. Closure of switch 66 would create three tuned L-C circuits operating on frequencies $f_1$, $f_2$ and $f_3$; the first consisting of inductor 67 and capacitor 68, the second consisting of inductor 69 and capacitor 70, and the third consisting of inductor 71 and capacitor 72. Many more combinations are, of course, possible using the same procedure.

The active circuit 12 could take one of at least two different forms. A first embodiment would consist of three first oscillators such as 19 with amplitude detectors and a second oscillator to switch the first oscillators each between two different frequencies, for example, $f_1$ and $f_x$; $f_2$ and $f_y$; and $f_3$ and $f_z$. Decoding logic as in FIG. 1 and FIG. 2 would determine which of the seven switches was closed.

Alternatively, a single first oscillator such as 19 switched sequentially to three frequencies $f_1$, $f_2$, and $f_3$ with an amplitude detector and a second oscillator driving a switch to switch said first oscillator to sequential frequencies could be used together with decoding logic in form shown in FIG. 1 and FIG. 2 in the same manner as herein descirbed.

As would be apparent to one of ordinary skill in the art, many more than seven switches and three frequencies may be used, for example, four frequencies would allow transmission of information as to which of fifteen switches were closed and so forth.

Although the invention has been described in conjunction with the foregoing specific embodiment, many alternatives, variations and modifications will be apparent to those of ordinary skill in the art. Those alternatives, variations and modifications are intended to fall within the spirit and scope of the appended claims.

I claim:

1. A system for transmission of data across a gap without a physical connection across that gap comprising:

passive circuit means including at least first and second series circuits each having inductive means, capacitive means connectable in series with said inductive means, and means for selectively completing each series circuit, and wherein said first series circuit is tuned to a first frequency of oscillation and said second series circuit is tuned to a second frequency of oscillation;

active circuit means including a first oscillator means inductively coupled to said passive circuit means whereby completing a series circuit in said passive circuit means causes a change in the amplitude of the oscillation voltage of said first oscillator;

said first oscillator means being operable at least at a first and second frequency of oscillation tuned to said first and second frequencies of oscillation of said passive circuit means, and wherein said active circuit means includes means to selectively switch said first oscillator means between said first and second frequencies of oscillation; and, means for detecting a change in amplitude of said first oscillator means whereby information regarding whether a series circuit in said passive circuit means is completed may be transmitted from said passive circuit to said active circuit across a gap without a physical connection therebetween.

2. A data transmission system as defined in claim 1 further comprising means for generating an output only when said passive circuit is tuned to said first frequency and said first oscillator is operating at said first frequency, and only when said passive circuit is tuned to said second frequency and said first oscillator is operating at said second frequency.

3. A data transmission system as defined in claim 2 wherein said active circuit further comprises a second oscillator means for generating a pulsed output operatively connected to said switch means and said means for generating an output whereby pulses from said second oscillator cause said switch means to switch said first oscillator between said first and second frequencies of oscillation and indicate to said means for generating an output whether said first oscillator is operating at said first or second frequency of oscillation.

4. A data transmission system as defined in claim 3 wherein said means for generating an output comprises logic circuit means for generating an output signal when the pulses from said second oscillator indicate said first oscillator is operating at said first frequency and said means for detecting a change in amplitude indicate said passive circuit is tuned to said first frequency, and which does not generate an output signal when the pulses from said second oscillator indicate said first oscillator is operating at said first frequency and said means for detecting a decrease in amplitude indicate said passive circuit is tuned to said second frequency.

5. A data transmission system as defined in claim 3 wherein said means for generating an output comprises logic circuit means which generates an output signal when the pulses from said second oscillator indicate said first oscillator is operating at said first frequency and said means for detecting a change in amplitude indicate said passive circuit is tuned to said first frequency, and which does not generate an output signal when the pulses from said second oscillator indicate said first oscillator is operating at said second frequency and said means for detecting a decrease in amplitude indicate said passive circuit is tuned to said first frequency.

6. A data transmission system as defined in claim 1 wherein said active circuit means includes means for detecting at which of said first and second frequencies of oscillation said first oscillator is operating.

7. A system for transmission of data across a gap without a physical connection across that gap comprising, in combination:
   passive circuit means comprising at least one inductor electrically connectable in series with at least one capacitor and switch means for selectively completing a series circuit consisting of said inductor and said capacitor whereby said passive circuit is resonant at a first frequency;
   an active circuit comprising an oscillator operable at an oscillation frequency substantially equal to said first frequency and inductivly coupled to said inductor in said passive circuit means whereby completion of said series circuit in said passive circuit means induces a change in the amplitude of the oscillation voltage of said oscillator;
   means coupled to said active circuit for detecting the amplitude of said oscillation voltage, said detecting means including a voltage amplitude detector having an output proportional to the peak amplitude of a voltage signal applied to its input; and,
   a voltage comparator having a first input coupled to the output of said detector and having a second input for receiving a reference voltage signal, said voltage comparator producing an output signal which transitions from a first level to a second level in response to an excursion of said detector voltage through a voltage range which includes said reference signal voltage level.

8. In combination:
   an oscillator;
   a first coil;
   first and second switches;
   first and second capacitors;
   a second coil electrically coupled to said oscillator and inductively coupled to said first coil;
   said first coil being electrically coupled to said first and second capacitors in series with said first and second signal switches, respectively, forming first and second resonant circuits when said switches are closed, said resonant circuits being resonant at first and second oscillation frequencies at which said oscillator operates;
   means coupled to said oscillator for automatically switching its frequency of oscillation from said first oscillation frequency to said second oscillation frequency, said oscillator being loaded to a descreased amplitude by coincidence of said oscillator frequency with one of said signal switches being closed forming one of said resonant circuits at the same frequency;
   a detector circuit coupled to said oscillator, the oscillation amplitude of said second coil being sensed by said detector circuit; and,
   logic means coupled to said oscillator for detecting the coincidence of said decreased amplitude and operation of said oscillator at one of said oscillation frequencies.

9. A data transmission system comprising, in combination:
   a first coil;
   first and second capacitors having capacitor values selected to yield first and second resonant oscillation frequencies, respectively, when electrically coupled to said first coil;
   a transmitter oscillator operable at said first and second resonant oscillation frequencies;
   first and second signal switches electrically coupled to said first and second capacitors, respectively, and said first coil;
   a second coil electrically coupled to said transmitter oscillator and inductively coupled to said first coil;
   said first coil being tuned to said first resonant oscillation frequency by the completion of a first series circuit including said first coil, first capacitor and first signal switch and being tuned to said second resonant oscillation frequency by the completion of a second series circuit including said first coil, second capacitor and second signal switch;
   an amplitude detector coupled to said transmitter oscillator, said transmitter oscillator amplitude being sensed by said amplitude detector whose function is to determine if said transmitter oscillator amplitude is decreased by loading of said first coil at one of said first and second resonant oscillator frequencies;
   switching means coupled to said transmitter oscillator for changing the transmitter oscillator frequency to a corresponding plurality of frequencies; and,
   logic means coupled to said transmitter oscillator and said switching means, said logic means being responsive to transmitter oscillator amplitude reduction due to loading induced by the closing of one of said signal switches coincident with occurrence of said transmitter oscillator frequency and said first resonant oscillation frequency for producing a logic output identifying the closing of a particular signal switch.

* * * * *